(12) United States Patent
Christensen et al.

(10) Patent No.: US 11,515,555 B2
(45) Date of Patent: Nov. 29, 2022

(54) REVERSIBLE SHUNTS FOR OVERCHARGE PROTECTION IN POLYMER ELECTROLYTE MEMBRANE FUEL CELLS

(71) Applicant: Robert Bosch GmbH, Stuttgart (DE)

(72) Inventors: John F. Christensen, Palo Alto, CA (US); Christina M. Johnston, Mountain View, CA (US); Yelena Gorlin, Menlo Park, CA (US); Sondra L. Hellstrom, Palo Alto, CA (US); Michael Metzger, Sunnyvale, CA (US)

(73) Assignee: ROBERT BOSCH GMBH, Stuttgart (DE)

( * ) Notice: Subject to any disclaimer, the term of this patent is extended or adjusted under 35 U.S.C. 154(b) by 34 days.

(21) Appl. No.: 16/867,848

(22) Filed: May 6, 2020

(65) Prior Publication Data
US 2021/0351426 A1 Nov. 11, 2021

(51) Int. Cl.
| | |
|---|---|
| *H01M 8/1051* | (2016.01) |
| *H01M 8/1067* | (2016.01) |
| *H01M 8/1039* | (2016.01) |
| *H01M 8/103* | (2016.01) |
| *H01M 8/1023* | (2016.01) |
| *H01M 8/10* | (2016.01) |

(52) U.S. Cl.
CPC ......... *H01M 8/1051* (2013.01); *H01M 8/103* (2013.01); *H01M 8/1023* (2013.01); *H01M 8/1039* (2013.01); *H01M 8/1067* (2013.01); *H01M 2008/1095* (2013.01)

(58) Field of Classification Search
None
See application file for complete search history.

(56) References Cited

U.S. PATENT DOCUMENTS

| | | | |
|---|---|---|---|
| 6,074,776 A | 6/2000 | Mao et al. | |
| 6,228,516 B1 | 5/2001 | Denton et al. | |
| 7,498,097 B2 | 3/2009 | Ueda et al. | |
| 8,350,519 B2 | 1/2013 | Brantner et al. | |
| 8,373,381 B2 | 2/2013 | Raiser et al. | |
| 2004/0109816 A1 | 6/2004 | Srinivas et al. | |
| 2004/0169165 A1 | 9/2004 | Srinivas | |
| 2014/0370414 A1* | 12/2014 | Schulz | C25B 1/04 429/450 |
| 2015/0171398 A1 | 6/2015 | Roumi | |
| 2016/0141896 A1 | 5/2016 | Brandon et al. | |

OTHER PUBLICATIONS

Chen et al., "Overcharge protection for rechargeable lithium batteries using electroactive polymers," Electrochem. Solid-State Lett. 7 (2): A23-A26 (2004) (Year: 2004).*

(Continued)

*Primary Examiner* — Daniel S Gatewood
(74) *Attorney, Agent, or Firm* — Michael Best & Friedrich LLP

(57) ABSTRACT

Described herein is a polymer-electrolyte-membrane fuel cell (PEMFC) that incorporates a shunt into the membrane separator that becomes electronically conductive around a well-defined anodic onset potential, thereby preventing excessive anodic potentials at the positive electrode that would otherwise drive deleterious parasitic reactions such as catalyst dissolution or catalyst and carbon oxidation.

25 Claims, 3 Drawing Sheets

(56) References Cited

OTHER PUBLICATIONS

Chen and Richardson, "Overcharge protection for rechargeable lithium batteries using electroactive polymers," Electrochem. Solid-State Lett. 7(2): A23-A26 (2004).

Chen and Richardson, "Overcharge protection for high voltage lithium cells using two electroactive polymers," Electrochem. Solid-State Lett. 9(1): A24-A26 (2006).

Chen and Richardson, "Overcharge Protection for 4 V Lithium Batteries at High Rates and Low Temperatures," J. Electrochem. Soc. 157(6): A735-A470 (2010).

Chen et al., "Characterization of an Electroactive Polymer for Overcharge Protection in Secondary Lithium Batteries," Electrochimica Acta 50(24): 4666-4673 (2005).

Chen et al., "Redox shuttles for safer lithium-ion batteries," Electrochimica Acta 54(21): 5605-5613 (2009).

Ferreira et al., "Instability of Pt/C Electrocatalysts in Proton Exchange Membrane Fuel Cells," J. Electrochem. Soc. 152 (11): A2256-A2271 (2005).

Kulikovsky, "A Simple Model for Carbon Corrosion in PEM Fuel Cell," J. Electrochem. Soc. 158(8): B957-B962 (2011).

Lochner et al., "Local degradation effects in automotive size membrane electrode assemblies under realistic operating conditions," Appl. Energy 260: 114291 (2020).

Meyers and Darling, "Model of Carbon Corrosion in PEM Fuel Cells," J. Electrochem. Soc. 153(8): A1432-A1442 (2006).

Novak et al., "Electrochemically Active Polymers for Rechargeable Batteries," Chem. Rev. 97(1):207-282 (1997).

Ohs et al., "Modeling hydrogen starvation conditions in proton-exchange membrane fuel cells," J. Power Sources 196 (1): 255-263 (2011).

Roncali, "Conjugated poly(thiophenes): synthesis, functionalization, and applications," Chem. Rev. 92(4):711-738 (1992).

Spry and Fayer, "Proton Transfer and Proton Concentrations in Protonated Nafion Fuel Cell Membranes," J. Phys. Chem. B. 113(30): 10210-10221 (2009).

Thomas-Alyea et al., "Modeling the Behavior of Electroactive Polymers for Overcharge Protection of Lithium Batteries," J. Electrochem. Soc. 151(4): A509 (2004).

Vijeth, et al., "Camphor sulfonic acid assisted synthesis of polythiophene composite for high energy density all-solid-state symmetric supercapacitor," J Mat Sci. Mat. Electronics 30:7471-7484 (2019).

Wang et al., "Electroactive Polymer Fiber Separators for Stable and Reversible Overcharge Protection in Rechargeable Lithium Batteries," J. Electrochem. Soc. 161(6):A 1039-A1044 (2014).

Zhang et al., "A review of platinum-based catalyst layer degradation in proton exchange membrane fuel cells," J. Power Sources 194(2): 588-600 (2009).

\* cited by examiner

REVERSIBLE SHUNTS FOR OVERCHARGE PROTECTION IN POLYMER ELECTROLYTE MEMBRANE FUEL CELLS

TECHNICAL FIELD

Described herein is a polymer-electrolyte-membrane fuel cell (PEMFC) that incorporates a shunt into the membrane separator that becomes electronically conductive around a well-defined anodic onset potential, thereby preventing excessive anodic potentials at the positive electrode that would otherwise drive deleterious parasitic reactions such as catalyst dissolution or catalyst and carbon oxidation.

BACKGROUND

A fuel cell (FC) is a device that converts energy of a chemical reaction into electrical energy (electrochemical device) without combustion. A polymer-electrolyte-membrane fuel cell (PEMFC; see FIG. 1) generally comprises an anode 104, a cathode 102, a polymer electrolyte membrane (PEM) 103, gas diffusion layers 101, and flow fields/current collectors (bipolar plate and flow field) 100. During normal operation, hydrogen gas 10 is oxidized and converted to protons 40 yielding two electrons 30 at the anode 104. At the cathode, oxygen 20 combines with the protons 40 and electrons to yield water 50. Protons 40 and water 50 can traverse the PEM 103, while gas ($O_2$ at cathode and $H_2$ at anode) are supplied to the electrodes from the flow fields via the gas diffusion layers (GDLs), and water is transported out via the GDLs and subsequently the flow fields. The oxidation and reduction reactions occurring within the fuel cell are shown below. The equilibrium potentials in each case are given with respect to the standard hydrogen electrode.

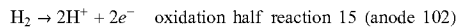
$H_2 \rightarrow 2H^+ + 2e^-$ oxidation half reaction 15 (anode 102)

$$E^\circ = 0 \text{ V} \frac{dE^\circ}{dT} = 0 \text{ mVK}^{-1};$$

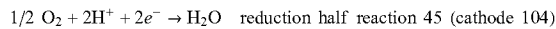
$1/2\ O_2 + 2H^+ + 2e^- \rightarrow H_2O$ reduction half reaction 45 (cathode 104)

$$E^\circ = 1.2291 \text{ V} \frac{dE^\circ}{dT} = -0.8456 \text{ mVK}^{-1}.$$

The overall reaction is:

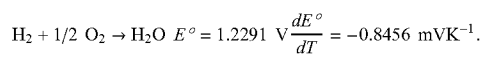
$$H_2 + 1/2\ O_2 \rightarrow H_2O \quad E^\circ = 1.2291 \text{ V} \frac{dE^\circ}{dT} = -0.8456 \text{ mVK}^{-1}.$$

This electrochemical process is a non-combustion process that does not generate airborne pollutants. Therefore, fuel cells are a clean, zero emission, highly efficient source of energy. Fuel cells can have 2-3 times greater efficiency than internal combustion engines and can use abundant or renewable fuels. Fuel cells produce electricity, water, and heat using fuel ($H_2$) 10 and oxygen 20. Water 50 (liquid and vapor) is the only emission when hydrogen 10 is the fuel.

The two half-reactions (15 and 45) normally occur very slowly at the low operating temperature of the fuel cell and catalysts are used on one or both the anode 102 and cathode 104 to increase the rates of each half reaction. Platinum (Pt) is the typical metal catalyst because it can generate high rates of $O_2$ reduction at the relatively low temperatures of the PEM fuel cells. Kinetic performance of PEM fuel cells is limited primarily by the slow rate of the $O_2$ reduction half reaction (cathode reaction, 45) which is typically more than 100 times slower than the $H_2$ oxidation half reaction (anode reaction, 15). The $O_2$ reduction half reaction is also limited by mass transfer issues.

In operation, the output voltage of an individual fuel cell under load is generally below one volt. Therefore, in order to provide greater output voltage, multiple fuel cells are usually stacked together and are connected in series to create a higher voltage fuel cell stack. Fuel cell stacks can then be further connected in series or parallel combinations to form larger arrays for delivering higher voltages or currents.

As fuel, such as hydrogen 40, flows into a fuel cell on the anode 104 side, a catalyst facilitates the separation of the hydrogen gas fuel into electrons and protons (hydrogen ions). The hydrogen ions pass through the membrane 103 (center of fuel cell) and, again with the help of the catalyst, combine with an oxidant, such as oxygen 20, and electrons 30 on the cathode side, producing water 50. The electrons 30, which cannot pass through the membrane 103, flow from the anode 104 to the cathode 102 through an external circuit containing a motor or other electrical load, which consumes the power generated by the cell.

A catalyst is used to induce the desired electrochemical reactions at the electrodes. The catalyst is often incorporated at the electrode/electrolyte interface by coating a slurry of the electrocatalyst particles to the polymer electrolyte membrane 103 surface. When hydrogen fuel 10 feeds through the anode catalyst/electrolyte interface, electrochemical reaction occurs, generating protons 40 and electrons 30 (15). The electrically conductive anode 104 is connected to an external circuit, which carries electrons by producing electric current. The polymer electrolyte membrane 103 is typically a proton conductor, and protons 40 generated at the anode catalyst migrate through the polymer electrolyte membrane 103 to the cathode 102. At the cathode catalyst interface, the protons 40 combine with electrons 30 and oxygen 20 to yield water 50 (45).

The catalyst is typically a particulate metal such as platinum and is dispersed on a high surface area electronically conductive support. Such catalysts, particularly platinum, are very sensitive to carbon monoxide poisoning. This is a particular concern for the anode catalyst for fuel cells operating on hydrogen, as CO is sometimes present in the hydrogen supply as a fuel contaminant and/or as a result of membrane cross-over from the oxidant supply in applications where air is employed.

The electronically conductive support material in the PEMFC typically consists of carbon particles. Carbon has an electrical conductivity (on the order of $10^{-2}$ to 1 S/cm, depending on the type) which helps facilitate the passage of electrons from the catalyst to the external circuit. Proton conductive materials, such as perfluorosulfonic acid (PFSA) membranes (e.g., Nafion®), are often added to facilitate transfer of the protons from the catalyst to the membrane interface.

To promote the formation and transfer of the protons and the electrons and to prevent drying out of the membrane 103, the fuel cells are operated under humidified conditions. To generate these conditions, hydrogen fuel 10 and/or oxygen 20 gases are sometimes humidified prior to entry into the fuel cell. In a supported electrocatalyst, carbon is relatively hydrophobic, and as such, the boundary contact between the reactive gases, water and the surface of the solid electrodes made of carbon contributes to high electrical contact resistance and ohmic power loss in the fuel cell resulting in lower efficiency of the fuel cell.

Voltage reversal occurs when a fuel cell in a series stack cannot generate sufficient current to keep up with the rest of the cells in the series stack. Several conditions can lead to voltage reversal in a PEM fuel cell, including insufficient oxidant, insufficient fuel, insufficient water, low or high cell temperatures, and problems with cell components or construction. Reversal generally occurs when one or more cells experience a more extreme level of one of these conditions compared to other cells in the stack. Undesirable electrochemical reactions may occur, which may detrimentally affect fuel cell components. Component degradation reduces the reliability and performance of the affected fuel cell, and in turn, its associated stack and array. Groups of cells within a stack can also undergo voltage reversal and even entire stacks can be driven into voltage reversal by other stacks in an array. Aside from the loss of power associated with one or more cells going into voltage reversal, this situation poses reliability concerns.

Voltage reversal also occurs upon $H_2$ depletion at the anode causing carbon corrosion on the anode; local depletion of H2 at the anode, resulting in carbon corrosion on the cathode, water blockage or mass transport restrictions; and during a start/stop event causing a $H_2$ or air front on the anode resulting in carbon corrosion on the cathode. See Zhang et al., *J. Power Sources* 194: 588-600 (2009), Reversal typically also results in excessive heat generation, which can induce pinholes in the membrane that lead to total cell (and possibly stack) failure. Methods to address voltage reversal, e.g., including oxygen evolution catalysts in the positive electrode to maintain voltages below the carbon corrosion potential and drive electrolysis of water, are ultimately insufficient. See e.g., Mandal et al., *J. Power Sources* 397: 397-404 (2018), Regions of the negative electrode may become depleted of $H_2$ and corrosion results. See FIG. 2A. Near $H_2$ depleted regions of negative electrode, there is a tendency for $O_2$ reduction at the negative electrode due to the high cathodic overpotential (anode operating near $H_2$ potential) (III). This locally draws protons across the membrane from the positive electrode, which in turn drives the local generation of protons at the positive electrode in a reaction that may involve water or water and carbon (IV). The latter reaction occurs at a high potential, which may be observed if the local cell overpotential is high enough.

What is needed is a polymer-electrolyte-membrane fuel cell (PEMFC) that incorporates a shunt into the membrane separator that prevents excessive anodic potentials at the positive electrode.

SUMMARY

One embodiment described herein is a polymer-electrolyte-membrane fuel cell (PEMFC) system comprising: a fuel source; an oxidation source; a positive electrode exposed to an eletrolyte membrane; a negative electrode exposed to the eletrolyte membrane; and one or more electrolyte membranes being positioned between the positive electrode and the negative electrode; wherein the electrolytic membrane comprises one or more carbon-containing semiconductors that increase rapidly in conductivity around a potential which will be defined here as a "shunting onset potential". These semiconductors are positioned in the membrane such that, under certain environmental conditions, they will provide an electronically conductive path across the membrane. In one aspect, the fuel source comprises hydrogen ($H_2$). In another aspect, the oxidation source comprises oxygen ($O_2$). In another aspect, the carbon-containing semiconductor comprises polyaniline, polypyrrole, polyfuran, thiophene, polythiophene, polyalkyl thiophene, polyacetylene, poly(9, 9-dioctylfluorene-alt-benzothiadiazole, poly(phenylenevinylenes), PEDOT, PEDOT:PSS, linear acenes, metal phthalocyanines, perylene derivatives, tetrathiafulvalenes, benzothiophenes, coronenes, porphyrins, rubrenes, thiophenes, C60, graphene, graphene nanoribbons, purified semiconducting carbon nanotubes, or combinations or derivatives thereof. In another aspect, the carbon-containing semiconductor comprises one or more poly(3-alkyl) thiophenes. In another aspect, the carbon-containing semiconductor comprises poly-3-butyl thiophene (P3BT). In another aspect, the electrolyte membrane comprises about 1% to about 50% of the carbon-containing semiconductor by volume of the membrane. In another aspect, the electrolyte membrane comprises about 0% to about 2%, about 1% to about 5%, about 5% to about 10%, about 10% to about 20%, about 20% to about 30%, about 30% to about 40%, about 40% to about 50%, about 1% to about 20%, about 5% to about 30%, about 10% to about 40%, about 20% to about 50%, about 30% to about 50%, about 1% to about 25%, or about 25% to about 50% of the carbon-containing semiconductor by volume of the membrane. In another aspect, the electrolyte membrane comprises about 5% to about 20% of the carbon-containing semiconductor by volume of the membrane. In another aspect, the electrolyte membrane comprises a first volume percent of the carbon-containing semiconductor at a first region of the fuel cell and a second volume percent of the carbon-containing semiconductor at second region of the fuel cell. In another aspect, the electrolyte membrane comprises a poly(perfluorosulfonic) acid membrane or a sulfonated polybenzimidazole membrane. In another aspect, the electrolyte membrane comprises a sulfonated tetrafluoroethylene copolymer membrane. In another aspect, the carbon-containing semiconductor becomes electronically conductive at a potential below the PEMFC's open circuit potential. In another aspect, the carbon-containing semiconductor becomes reversibly oxidized in the range of −0.01 to about 1.4 V vs. a standard hydrogen electrode (SHE). In another aspect, the shunting onset potential comprises a voltage of about 0.8 to about 2.0 vs. a standard hydrogen electrode (SHE). In another aspect, the shunting onset potential comprises a voltage of greater than about 0.90 V vs. a standard hydrogen electrode (SHE). In another aspect, the carbon-containing semiconductor has a conductivity of about $1\times10^{-3}$ S/cm to about $1\times10^{-1}$ S/cm at a potential above the shunting onset potential. In another aspect, the carbon-containing semiconductor limits the potential of the positive electrode to a voltage lower than 1.5 V vs. a standard hydrogen electrode (SHE). In another aspect, the electrolyte membrane comprises a bilayer comprising a first carbon-containing semiconductor in a first layer and a second carbon-containing semiconductor in a second layer. In another aspect, the first and second carbon-containing semiconductors have different or overlapping shunting onset potentials. In another aspect, the electrolyte membrane comprises a plurality of layers, each layer comprising one or more carbon-containing semiconductor having different or overlapping shunting onset potentials. In another aspect, each layer of the electrolyte membrane comprises the same, different, or combinations thereof of volume percentages of one or more carbon-containing semiconductors.

Another embodiment described herein is a method for preventing current reversal or electrode overpotential in a polymer-electrolyte-membrane fuel cell (PEMFC) system, the method comprising incorporating into one or more electrolyte membranes one or more carbon-containing semiconductors that become electronically conductive at a specific onset potential. In one aspect, their shunting onset potential comprises about 0.9 V vs. a standard hydrogen electrode (SHE).

Another embodiment described herein is a means for preventing current reversal or cathode overpotential in a polymer-electrolyte-membrane fuel cell (PEMFC) system comprising incorporating into one or more electrolyte membranes one or more carbon-containing semiconductors that become electronically conductive at a specific onset potential. In one aspect, their shunting onset potential comprises about 0.9 V vs. a standard hydrogen electrode (SHE).

Another embodiment described herein is a polymer-electrolyte-membrane fuel cell (PEMFC) system comprising: a $H_2$ (g) fuel source; an $O_2$ (g) source; a positive electrode exposed to an eletrolyte; a negative electrode exposed to an eletrolyte; and one or more electrolyte membranes comprising sulfonated tetrafluoroethylene copolymer being positioned between the positive electrode and the negative electrode; wherein the electrolyte membrane further comprises a specific volume percentage of one or more carbon-containing semiconductors that become electronically conductive at a shunting onset potential of greater than about 0.9 V vs. a standard hydrogen electrode (SHE).

DETAILED DESCRIPTION

Figure 1:
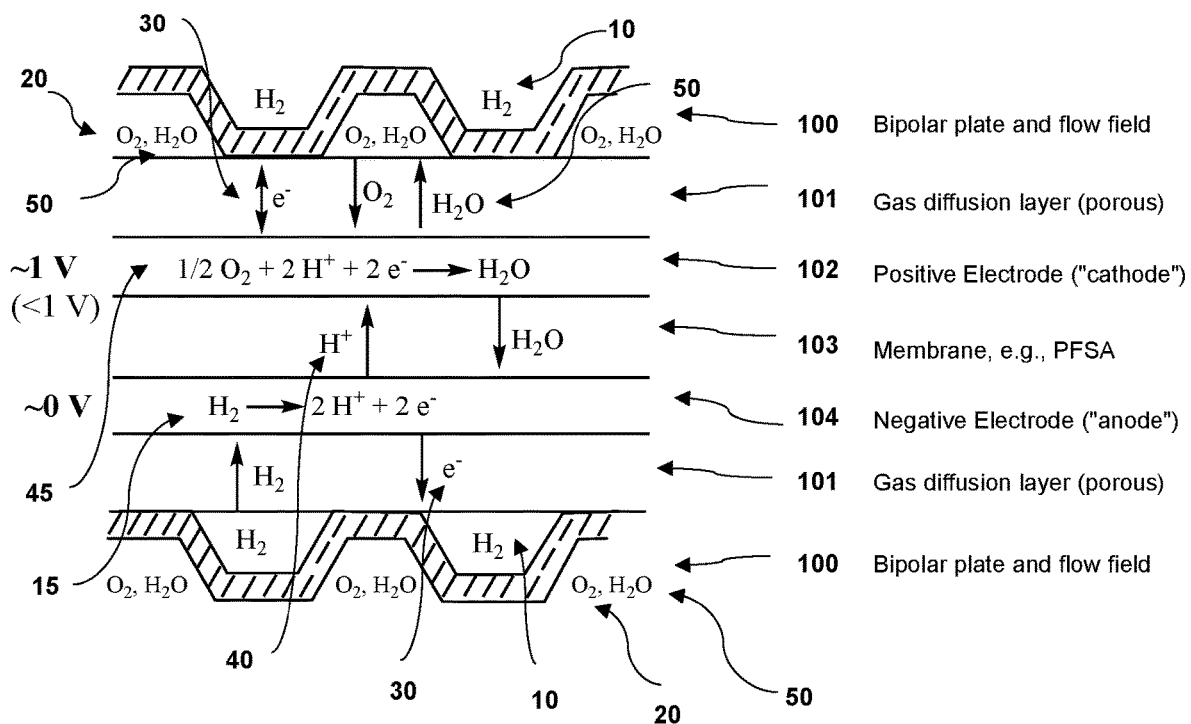
FIG. 1 shows a polymer-electrolyte-membrane fuel cell (PEMFC) with associated chemical reactions under normal operating conditions.

In this specification and in the claims, reference will be made to several terms which shall be defined to have the following meanings:

As used in the specification and the appended claims, the singular forms "a," "an," and "the" include plural referents unless the context clearly dictates otherwise.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" as used herein indicates that the subsequently described event or circumstance may or may not occur, and that the description includes instances where said event or circumstance occurs and instances where it does not.

"Effective amount" as used herein refers to a composition or property as provided herein is meant such amount as can perform the function of the composition or property for which an effective amount is expressed. The exact amount required often varies from process to process, depending on recognized variables such as the compositions employed, and the processing conditions observed. Thus, it is not possible to specify an exact "effective amount."

"Substituted conducting polymer" as used herein refers to any chemical variation to a conducting polymer that retains the functionalities of conductivity and hetero atoms. For example, poly-3-butyl-thiophene is a "substituted" polythiophene.

"Fuel cell" (FC) as used herein is an electrochemical device that converts chemical energy into electrical energy without combustion.

"PEMFC" as used herein is a type of fuel cell that utilizes a Polymer Electrolyte Membrane (PEM to carry protons between two catalytic electrode layers, thus generating electrical current. A PEM typically operates at temperatures up to 100° C.

"Proton Exchange Membrane" as used herein is also known or referred to as polymer electrolyte membrane (PEM), in the fuel cell art. In one embodiment, the PEM membrane comprises one or more "carbon-containing semiconductors" capable of shunting current under certain environmental conditions and preventing the positive electrode from reaching a high potential.

A "carbon-containing semiconductor" as used here in refers to a carbonaceous polymer that is capable of shunting current under specific environmental conditions. Exemplary carbon-containing semiconductors include polyaniline, polypyrrole, polyfuran, thiophene, polythiophene, polyalkyl thiophene, polyacetylene, poly(9,9-dioctylfluorene-alt-benzothiadiazole, poly(phenylenevinylenes), PEDOT, PEDOT:PSS, linear acenes, metal phthalocyanines, perylene derivatives, tetrathiafulvalenes, benzothiophenes, coronenes, porphyrins, rubrenes, thiophenes, C60, graphene, graphene nanoribbons, purified semiconducting carbon nanotubes, or combinations or derivatives thereof.

"Membrane Electrode Assembly" (MEA) as used herein refers to assembly which normally comprises a polymer membrane with affixed/adjacent electrode layers. In some cases, the MEA may also include gas diffusion layer/materials.

"Microporous layer (MPL) as used herein refers to a porous layer located between the catalyst layer (CL) and gas diffusion layer (GDL). The MPL typically contains a hydrophobic agent, polytetrafluoroethylene (PTFE), and carbon black.

"Catalyst layer" (CL) as used herein refers to the active region for the electrochemical reactions in a fuel cell. An effective catalyst layer should have transport channels for protons, electrons, reactants, and products. The catalyst layer is typically made from a catalyst ink containing catalyst powder, binder and solvents applied to a supporting material.

"Electrocatalyst" or "catalyst," as used herein is a metal which is catalytic for fuel cell reactions, typically supported on a catalyst support.

"Supported catalyst" as used herein refers to a catalyst metal dispersed on a support.

"Catalyst support" as used herein is a material upon which metal is dispersed, which is typically conductive (e.g., carbon, a conducting polymer, or a metal oxide).

"Electrode," as used herein, is a supported electrocatalyst in contact with or affixed to a membrane. The electrode may include other materials in addition to the electrocatalyst.

"Metal" as used herein refers to precious metal, noble metal, platinum group metal, platinum, alloys, and oxides of same, and compositions that include transition metals and oxides of same. For example, the metal can be platinum, iridium, osmium, rhenium, ruthenium, rhodium, palladium, vanadium, chromium, or a mixture thereof, or an alloy thereof, specifically, the metal can be platinum. As described herein, the metal can also be alloys or metal oxides effective as catalysts. As used herein, a "metal" acts as a catalyst for the reactions occurring in the fuel cell.

"Ionomer," as used herein is an ionically conductive polymer (e.g., Nafion®). An ionomer is also frequently used in the electrode layer to improve ionic conductivity.

"Membrane," 103 as used herein refers to a polymer electrolyte membrane, solid polymer electrolyte, proton exchange membrane, separator, or polymer membrane. The "membrane" is an ionically conductive, dielectric material against which catalytic electrodes are placed or affixed. An exemplary membrane is a sulfonated tetrafluoroethylene-based fluoropolymer-copolymer (e.g., Nafion®), which can be obtained in varying thicknesses, equivalent weights, etc.

"Electrolyte" as used herein is a nonmetallic electric conductor in which current is carried by the movement of ions or a substance that when dissolved in a suitable solvent becomes an ionic conductor. The polymer membrane of a fuel cell can be an electrolyte.

"Oxygen reduction reaction," "cathode reaction," or "cathodic process," as used herein is a reaction in which oxygen gas is reduced in the presence of protons, producing water.

"Hydrogen oxidation reaction," "HOR," "anode reaction," or "anodic process" as used herein is a reaction in which hydrogen gas is converted into protons and electrons.

"Protons," "$H^+$," "hydrogen ions," or "positive ions," as used herein refer to a positively charged portion of hydrogen atom which results from reaction over catalyst material.

"Anode" 104 as used herein is the negative electrode where fuel oxidation reaction occurs.

"Cathode" 102 as used herein is the positive electrode where oxidant-reduction reaction occurs.

"Gas diffusion layer," "GDL" or "porous backing layer" 101 as used herein refers to a layer adjacent to the electrodes which aides in diffusion of gaseous reactants across the electrode surface; it is typically a carbon cloth or carbon-based/carbon-containing paper (e.g., one manufactured by Toray). The GDL should be electrically conductive to carry electrons through an external circuit.

"Bipolar plate" 100 as used herein is the portion of a fuel cell adjacent to the GDL through which electrons pass to an external circuit; it may also contain channels or paths (flow field) to assist in gas distribution and is typically made of graphite or conductive composites. In some embodiments, cooling channels are integrated into the BPP.

"Flow field" as used herein is the scheme for distributing gaseous reactants across the electrode. A flow field may be part of a bipolar plate 100 or a gas diffusion layer.

"Insulator" or "dielectric" as used herein refers to a material which is not electrically conductive.

"Electrical conductivity" or "electronic conductivity" as used herein refers to the ability of a material to conduct electrons.

"Protonic conductivity" or "ionic conductivity" (IC), as used herein refers to the ability of a material to conduct ions or protons.

"Carbon black" as used herein refers to a conductive aciniform carbon utilized, for example, as a catalyst support.

"Porosity" or "permeability" as used herein refers to macroscopic porosity of an electrode structure (i.e., related to ability of diffusion of gaseous reactants through an electrode layer).

"Particulate" as used herein refers to a material of separate particles.

"Polarization curve," "IV curve," or "current-voltage curve," as used herein refers to data/results from electrochemical analysis of MEAs or catalyst materials.

"Current density" as used herein refers to the current flowing per unit electrode area.

A "conductive material" as used herein refers to any material which is effective for the transmitting electrical current. Specifically, the conductive material can be a conducting polymer. For example, perfluorosulfonic acid (PFSA), polyaniline, polypyrrole, polythiophene, polyfuran, poly(p-phenylene-oxide), poly(p-phenylene-sulfide), substituted conducting polymers, or mixtures or derivatives thereof can be used. Specifically, the conducting polymer can include polyaniline, polypyrrole, polyfuran, polythiophene, or mixtures or derivatives thereof. Mixtures of these polymers can include physical mixtures as well as copolymers of the monomers of the respective polymers. As used herein, reference to a polymer also covers a copolymer.

Fuel Cell

A typical polymer-electrolyte-membrane fuel cell (PEMFC) (FIG. 1) comprises one or more membrane electrode assemblies (MEA), backing layers and flow fields/current collectors, fuel feed, and oxidant feed.

Membrane Electrode Assembly (MEA)

The MEA comprises an anode 104, a cathode 102, and a membrane 103. The anode 104 can be an electrode of the present invention. The electrode should be electrically conducting, porous enough to let reactants diffuse to the metal, and able to carry protons to the membrane. The cathode 102 can also be an electrode. Current technology varies with the manufacturer, but total Pt loading of the electrode has decreased from 4 mg/cm$^2$ to about 0.2 mg/cm$^2$. Pt loadings of 0.5 mg/cm$^2$ are capable to generate about 0.5 amperes per mg Pt.

Membrane/electrode (104/103/102) assembly construction varies greatly, but the following is one of the typical procedures. The supported catalyst/electrode material is first prepared in liquid "ink" form by thoroughly mixing together appropriate amounts of supported catalyst (powder of metal, e.g., platinum dispersed on carbon) and a solution of the membrane material (ionomer) dissolved in a solvent, e.g., alcohols. Once the "ink" is prepared, it is applied to the surface of the membrane, e.g., Nafion®, in several different ways. The simplest method involves painting the catalyst "ink" directly onto a dry, solid piece of membrane. The wet supported catalyst layer and the, membrane are heated until the catalyst layer is dry. The membrane is then turned over, and the procedure is repeated on the other side. Supported catalyst layers are thus on both sides of the membrane. The dry membrane/electrode assembly is rehydrated by immersing in dilute acid solution to also ensure that the membrane is in the H$^+$ form needed for fuel cell operation. The final step is the thorough rinsing in distilled water. The membrane/electrode assembly can be assembled into the fuel cell hardware.

Addition of carbon-containing semiconductors to a Nafion® membrane could be accomplished in a number of ways. Without restricting the scope of the invention, semiconducting filaments, particles, or coated beads could be blended into a Nafion® dispersion, e.g., by sonication, above a percolation threshold prior to solvent-casting of a membrane. Alternatively, membranes could be fabricated with controlled porosity, and carbon-containing semiconductors could be solution cast, or chemically or electrochemically deposited into the pores.

Normal Nafion® will dehydrate (thus lose proton conductivity) when temperature is above ~80° C. This limitation can be problematic for fuel cells, because higher temperatures are desirable for a better efficiency and CO tolerance of the platinum catalyst. Silica and zirconium phosphate can be incorporated into Nafion® water channels through in situ chemical reactions to increase the working temperature to above 100° C.

The membrane/electrode assembly can have a total thickness of about 50 µm (excluding gas diffusion and microporous layers), for example, and conventionally generate more than 0.5 an ampere of current for every square cm of membrane/electrode assembly at a voltage between the cathode and anode of 0.7 V, when encased within well engineered components. For example, the membrane is about 15-20 µm and the anode and cathode conductive layers are about 10 µm each. This provide a membrane/electrode assembly of about 40 µm. The gas diffusion layer and microphorus layer are about 300 µm. A five-layer MEA is typically about 640 µm.

Gas Diffusion Layers

The fuel cell can include gas diffusion layers. The layers are generally one next to the anode and another next to the cathode and made of a porous carbon paper or carbon cloth. The layers are made of a material that can conduct the electrons exiting the anode and entering the cathode.

Bipolar Plate/Flow Fields/Current Collectors

The fuel cell can include flow fields and current collectors 100. Pressed against the outer surface of each backing layer can be a piece of hardware, called a bipolar plate 100, which often serves the dual role of flow field and current collector. The plates are generally made of a lightweight, strong, gas impermeable, electron-conducting material; graphite, metals, or composite plates are commonly used.

The bipolar plates can provide a gas flow field such as channels machined into the plate. The channels carry the reactant gas from the point at which it enters the fuel cell to the point at which the gas exits. The pattern, width, and depth have a large impact on the effectiveness of the distribution of the gases evenly across the active area of the membrane/electrode assembly. The flow field also affects water supply to the membrane and water removal from the cathode.

The bipolar plates can also serve as current collectors. Electrons produced by the oxidation of hydrogen can be conducted through the anode, through the backing layer and through the plate before they can exit the cell, travel through an external circuit, and re-enter the cell at the cathode plate. Typically, many cells are stacked together to provide a higher voltage and the internal bipolar plates transport electrons from one cell to the next.

Transfer Membrane/Electrolyte

The polymer electrolyte membrane (PEM) 103 (or proton exchange membrane), carries the necessary protons from the anode 104 to the cathode 102 while keeping the gases ($H_2/O_2$) safely separate. The thickness of the membrane in a membrane/electrode assembly can vary with the type of membrane. The thickness of the supported catalyst layers depends on how much metal is used in each electrode. For example, for supported catalyst layers containing about 0.15 mg Pt/cm$^2$, the thickness of the supported catalyst layer can be about 10 µm to about 20 µm. The thickness of the supported catalyst layer can be, for example, about 0.1 to about 50 µm, more specifically on the order of about 20 to about 30 µm. Thicknesses above 50 µm appear to increase the mass transfer problems too much to be effective.

The membrane of the MEA 103 can be a dielectric, ionically conductive material. It is desired that the membrane be sufficiently durable to withstand conditions within a fuel cell. The membrane of the MEA can be an ionomer, specifically a perfluoro sulfonate ionomer or a sulfonated or phosphorylated polybenzimidazole ionomer. More specifically, the membrane can be a sulfonated tetrafluoroethylene copolymer cation exchange ionomer such as Nafion® (Chemours). Nafion® is a perfluorinated polymer (PFSA) that contains small proportions of sulfonic or carboxylic ionic functional groups (e.g., tetrafluoroethylene-perfluoro-3,6-dioxa-4-methyl-7-octenesulfonic acid copolymer).

In one embodiment described herein, the MEA membrane further comprises one or more carbon-containing semiconductors capable of shunting current under certain environmental conditions and preventing the positive electrode from reaching a high potential. In one embodiment, the carbon-containing semiconductor comprises polyaniline, polypyrrole, polyfuran, thiophene, polythiophene, polyalkyl thiophene, polyacetylene, poly(9,9-dioctylfluorene-alt-benzothiadiazole, poly(phenylenevinylenes), PEDOT, PEDOT:PSS, linear acenes, metal phthalocyanines, perylene derivatives, tetrathiafulvalenes, benzothiophenes, coronenes, porphyrins, rubrenes, thiophenes, C60, graphene, graphene nanoribbons, purified semiconducting carbon nanotubes, or combinations or derivatives thereof. In another aspect, the carbon-containing semiconductor comprises a semiconducting network of mixed-chirality carbon nanotubes. In another aspect, the carbon-containing semiconductor is a thiophene, polythiophene, or poly-alkyl-thiophene.

In one embodiment described herein, the MEA membrane comprises one or more carbon-containing semiconductors at a volume percentage of about 0% to about 50% by volume of the membrane. In one aspect the volume percentage of the one or more carbon-containing semiconductors is about 5% to about 50%. In another aspect, the volume percentage of the one or more carbon-containing semiconductors is about 0% to about 2%, about 1% to about 5%, about 5% to about 10%, about 10% to about 20%, about 20% to about 30%, about 30% to about 40%, about 40% to about 50%, about 1% to about 20%, about 5% to about 30%, about 10% to about 40%, about 20% to about 50%, about 30% to about 50%, about 1% to about 25%, or about 25% to about 50%, by volume of the membrane.

In another embodiment, the MEA membrane contains different volume percentages in particular regions of the membrane (or layers thereof). In one aspect, regions of the membrane near the inlet or outlet may contain greater volume percentages of the one or more carbon-containing semiconductors than other regions of the membrane. This would permit shunting in regions of the membrane most likely to experience higher potentials.

Described herein is a means of reducing high anodic overpotential at the positive electrode and limiting the rate of carbon consumption and/or Pt oxidation by effectively shorting the membrane with an electronic conductor. Ideally this conductive mechanism is activated only under deleterious conditions such as when the local potential of the positive electrode is greater than under normal operating conditions.

The PEMFC incorporates a shunt into the membrane separator that becomes electronically conductive at a particular anodic onset potential, thereby preventing excessive anodic potentials at the positive electrode that would otherwise drive deleterious parasitic reactions such as catalyst dissolution or catalyst and carbon oxidation.

Polythiophenes are electroactive polymers that become electronically conductive when doped. In particular, p-doped polythiophenes can be generated when they are in contact with an electrode at high potential. When polythiophenes are integrated into the membrane and the positive electrode locally experiences a high potential excursion (e.g., due to the above described phenomenon), the polythiophene may become activated (i.e., p-doped) and thereby electronically conductive. Once there is a continuous electronic pathway established between the two electrodes, the p-doped polythiophene has a mediating effect on the locally high positive electrode potential by allowing electrons to be shunted from the negative electrode to the positive electrode. This process is reversible; that is, when the potential drops again (e.g., by drawing sufficient current across the cell), the polythiophene doping level will decrease and the electronic conductivity will drop, such that the membrane again becomes relatively insulating.

In particular, polythiophenes that react in a particular voltage window are desirable such that they are activated above the normal operating potential of the positive electrode but below the potential at which carbon corrosion, catalyst dissolution, or other degradation mechanisms occur at an unacceptable rate.

There is evidence that thiophenes are stable in Nafion® sulfonated tetrafluoroethylene-based fluoropolymer-copolymer membranes. See Tazi and Savadogo, Electrochemica Acta 45(25-26): 4326-4339 (2000). Polythiophenes can also be incorporated into Nafion® or similar proton-conducting membranes used in PEMFCs.

One embodiment described herein is a polymer-electrolyte-membrane fuel cell (PEMFC) system comprising: a fuel source, an oxidation source, a positive electrode exposed to an electrolyte membrane, a negative electrode exposed to the electrolyte membrane; and one or more electrolyte membranes being positioned between the positive electrode and the negative electrode; wherein the electrolytic membrane comprises one or more carbon-containing semiconductors that become electronically conductive at a specific shunting onset potential.

In some embodiments a "bilayer" membrane is used as the separator, in which the layer adjacent to the positive electrode includes a carbon-containing semiconductor that becomes conductive above a potential $V_1$ and the layer adjacent to the negative electrode includes a carbon-containing semiconductor that becomes conductive above a potential $V_2$, with $V_1 > V_2$. This is advantageous when the polymer adjacent to the positive electrode is unstable at the potential of the negative electrode, or if the polymer adjacent to the negative electrode is unstable at the potential of the positive electrode.

In some embodiments, three or more layers are used that include carbon-containing semiconductors that become electronically conductive in different potential windows such that all polymers are stable during normal operation of the cell and when the shunt is activated via excessive anodic potential at the positive electrode. In another embodiment, the layers have the same or different volume percentages of the one or more carbon-containing semiconductors.

These semiconductors can have overlapping potential windows, the same potential window, or different potential window. In another aspect, the outer layers may have increased volume percentages of the carbon-containing semiconductors and the inner layers may have no or decreased volume percentages of the carbon-containing semiconductors. In one aspect, membrane regions localized in proximity to the inlet or outlet may contain greater volume percentages of the carbon-containing semiconductors than other regions of the membrane or other membrane layers.

In some embodiments, the carbon-containing semiconductor becomes electronically conductive at a potential below the open-circuit potential of the cell. This can be advantageous because even the open circuit potential may be high enough to drive degradation reactions at the positive electrode. In this configuration the fuel cell stack behaves as an electronic resistor when current is not applied (or when a sufficiently low current is applied) and the positive electrode potential of each cell is allowed to exceed the redox potential of the shunt.

It will be apparent to one of ordinary skill in the relevant art that suitable modifications and adaptations to the compositions, formulations, methods, processes, and applications described herein can be made without departing from the scope of any embodiments or aspects thereof. The compositions and methods provided are exemplary and are not intended to limit the scope of any of the specified embodiments. All the various embodiments, aspects, and options disclosed herein can be combined in any variations or iterations. The scope of the compositions, formulations, methods, and processes described herein include all actual or potential combinations of embodiments, aspects, options, examples, and preferences herein described. The exemplary apparata, designs, compositions, and formulations described herein may omit any component, substitute any component disclosed herein, or include any component disclosed elsewhere herein. Should the meaning of any terms in any of the patents or publications incorporated by reference conflict with the meaning of the terms used in this disclosure, the meanings of the terms or phrases in this disclosure are controlling. Furthermore, the foregoing discussion discloses and describes merely exemplary embodiments. All patents and publications cited herein are incorporated by reference herein for the specific teachings thereof.

EXAMPLES

Example 1

The reversible hydrogen electrode (RHE) is described by Equation 1:

$$RHE = SHE \times \frac{RT}{F} \times \left[\ln(a_{H^+}) - \frac{1}{2} \times \ln(p_{H_2})\right],$$

where SHE is the standard hydrogen electrode, defined as 0 V at 25° C., 1 atm pressure, and 1 M H$^+$ concentration. Here T=temperature in Kelvin, R=the gas constant (8.314 J/mol–K), F is Faraday's constant (96485 C/mol), $a_{H+}$ is the activity or concentration of protons in the proton-conducting polymer, and $p_{H2}$ is the partial pressure of hydrogen gas at the catalyst-polymer interface or gas-catalyst-polymer triple-phase boundary.

For a fuel cell operating at 80° C., a hydrogen pressure of 2 atm, and proton concentration of 2 M (i.e., pH=~–0.3), the potential at the negative electrode of the fuel cell, where H$_2$ gas is oxidized into protons, would be 10.5 mV vs. SHE.

A typical operating potential of the positive electrode would be 0.6 to 0.8 V vs. RHE, or up to ~0.81 V vs. SHE.

The electroactive polymer poly-3-butyl thiophene (P3BT) is oxidized and becomes increasingly conductive in the potential window 3 to 4.1 V vs. Li metal. See Thomas-Alyea et al., *J. Electrochem. Soc.* A509 (2004), which is incorporated by reference herein for such teachings. The reversible Li metal potential is −3.04 V vs. SHE; accordingly, P3BT is reversibly oxidized in the potential window −0.04 to 1.06 V vs. SHE. The conductivity increase as the oxidation state of P3BT increases. Id. For example, at an oxidation state of 0.2, which is reached at a potential of approximately 4.03 V vs. Li, or 0.99 V vs. SHE, the polymer conductivity is between $1\times10^{-3}$ and $1\times10^{-2}$ S/cm. At the typical operating potential of 0.81 V vs. SHE, the conductivity is below $1\times10^{-4}$ S/cm.

Assuming a membrane thickness of 20 μm (typical for PEMFC), about 10% volume fraction of P3BT in the membrane 105, 106, and a tortuosity factor of 2, the electronic membrane resistance would be 4 ohm-cm$^2$ at a conductivity of $1\times10^{-2}$ S/cm and 400 ohm-cm$^2$ at a conductivity of $1\times10^{-4}$ S/cm.

At the typical operating positive electrode potential of 0.81 V vs. SHE, the membrane 105, 106 is effectively an electronic insulator (vast majority of current is carried by protons). The corresponding membrane electronic resistance in this case is >1000 ohm-cm$^2$. See FIG. 3 B). At greater potentials (~0.99 V vs. SHE and above, including at open circuit), the membrane 105, 107 has sufficient electronic conductivity to shunt the cell and prevent the positive electrode from reaching a significantly higher potential, depending upon the current density through the $H_2$-depleted region. The corresponding membrane electronic resistance in this case is ~10 ohm-cm$^2$. See FIG. 3A.

Figures 2A, 2B:
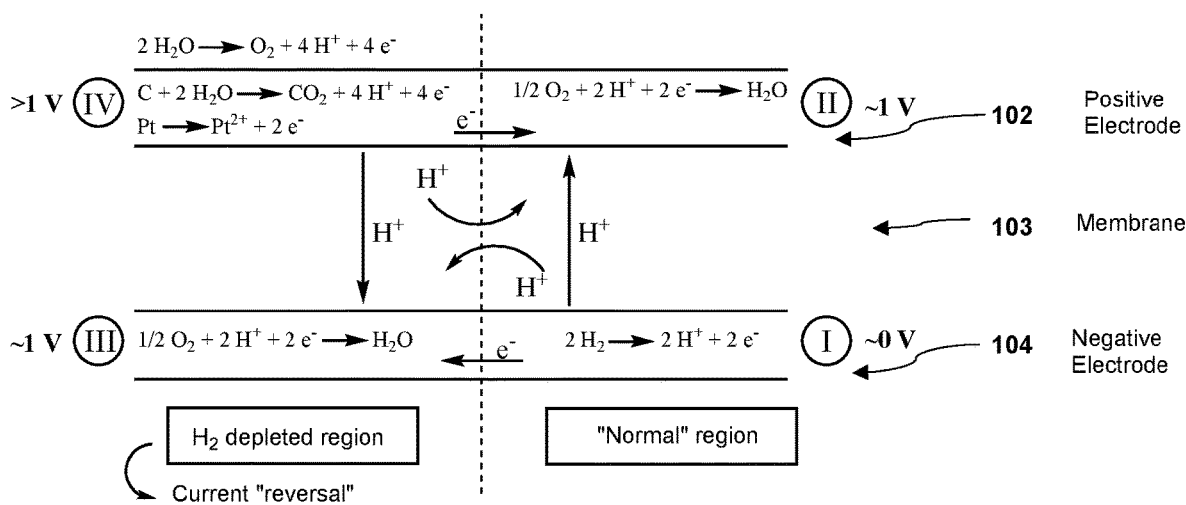
FIG. 2A shows a PEMFC at excessive anodic potentials and the corresponding corrosion that occurs during $H_2$ depletion in part of the negative electrode.
FIG. 2B shows the normal part of the fuel cell.

Meyers and Darling show that a current density of <10 mA/cm$^2$ would be sufficient to sustain oxygen reduction at the negative electrode. Meyers and Darling, *J. Electrochem. Soc.* A1432 (2006). Without a shunt, as described herein, the corresponding reaction at the positive electrode may involve carbon corrosion and or oxygen evolution at potentials above 1.5 V vs. SHE. See FIG. 2A (IV). However, with a shunt 105, 107, both oxygen reduction at the negative and oxygen evolution (or carbon corrosion) at the positive can effectively be terminated. See FIG. 3A. Even at 10 mA/cm$^2$, the overpotential associated with a 10 ohm-cm$^2$ shunt is only 100 mV, which limits the potential of the positive electrode below ~1.1 V vs. SHE.

Figure 3A:
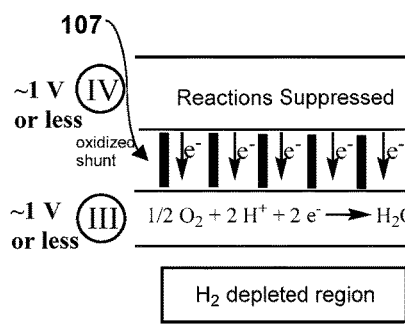
FIG. 3A shows a PEMFC with oxidized shunt in the separator that prevents high potentials at the positive electrode during $H_2$ depletion in part of the negative electrode.

The shunt, once activated (105, 107), effectively deactivates regions of the cell where there is $H_2$ depletion in the flow field adjacent to the negative electrode, which may occur during startup, shutdown, or due to local blockage of the flow field or gas diffusion layer by water droplets. FIG. 3A.

Figure 3B:
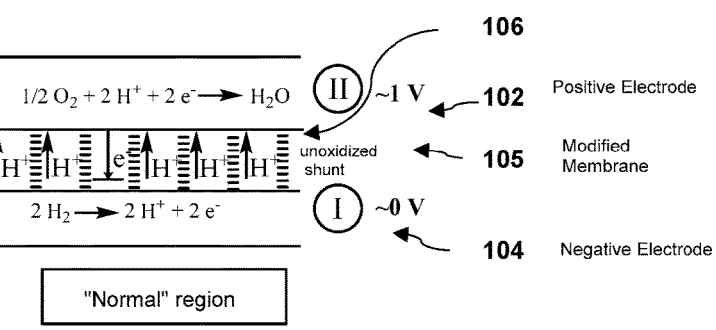
FIG. 3B shows the normal part of the fuel cell with an unoxidized shunt.

The oxidation (e.g., via doping) of the semiconductor (e.g., P3BT) is expected to occur at high potentials in the presence of sulfonyl groups in the proton conducting membrane. Protons of the polysulfonic acid are displaced by positively charged portions of the thiophene (or other electroactive polymer), maintaining an overall electrically neutral membrane. The protons combine with reduced oxygen at the positive electrode to form water. When the potential of the positive electrode drops, the thiophene groups will be reduced and lose their positive charge and the negative charge of the sulfonyl groups will again be balanced by the positive charge of protons generated from $H_2$ gas at the negative electrode. FIG. 3B.

The electroactive polymers may be deployed at specific locations in the stack. Implementing this could improve overall performance and durability but must be balanced against the higher cost of introducing a gradient in the manufacturing process. Membranes with a gradient in thiophene concentration are useful, with less at the inlet and more at the outlet (where the risk of $H_2$ starvation is likely higher). Micro-diffraction experiments have shown that the regions close to the outlet of the flow field show more significant Pt size growth, possibly indicating higher potential excursions at the positive electrode in these regions that may be related to $H_2$ starvation. In other systems, $H_2$ starvation may occur close to the inlet.

In some aspects, a bilayer or multiple membrane layers are used that include electroactive polymers that become electronically conductive in different potential windows such that all polymers are stable during normal operation of the cell and when the shunt is activated via excessive anodic potential at the positive electrode. This can be advantageous because even the open circuit potential may be high enough to drive degradation reactions at the positive electrode. In this configuration the fuel cell stack behaves as an electronic resistor when current is not applied (or when a sufficiently low current is applied) and the positive electrode potential of each cell can exceed the redox potential of the electroactive polymer.

What is claimed:

1. A polymer-electrolyte-membrane fuel cell (PEMFC) system comprising:
   a fuel source;
   an oxidation source;
   a positive electrode exposed to an electrolyte membrane;
   a negative electrode exposed to the electrolyte membrane; and
   one or more electrolyte membranes being positioned between the positive electrode and the negative electrode;
   wherein
   the electrolytic membrane comprises one or more carbon-containing semiconductors positioned as shunts across the membranes that become electronically conductive at a shunting onset potential; and
   the electrolyte membrane comprises a first volume percent of the carbon-containing semiconductor at a first region of the fuel cell and a second volume percent of the carbon-containing semiconductor at second region of the fuel cell.

2. The PEMFC system of claim 1, wherein the fuel source comprises hydrogen ($H_2$).

3. The PEMFC system of claim 1, wherein the oxidation source comprises oxygen ($O_2$).

4. The PEMFC system of claim 1, wherein the carbon-containing semiconductor comprises polyaniline, polypyrrole, polyfuran, thiophene, polythiophene, polyalkyl thiophene, polyacetylene, poly(9,9-dioctylfluorene-alt-benzothiadiazole), poly(phenylenevinylenes), PEDOT, PEDOT:PSS, linear acenes, metal phthalocyanines, perylene derivatives, tetrathiafulvalenes, benzothiophenes, coronenes, porphyrins, rubrenes, thiophenes, C60, graphene, graphene nanoribbons, purified semiconducting carbon nanotubes, or combinations or derivatives thereof.

5. The PEMFC system of claim 1, wherein the carbon-containing semiconductor comprises a semiconducting network of mixed-chirality carbon nanotubes.

6. The PEMFC system of claim 1, wherein the carbon-containing semiconductor comprises one or more poly(3-alkyl) thiophenes.

7. The PEMFC system of claim 1, wherein the carbon-containing semiconductor comprises poly-3-butyl thiophene (P3BT).

8. The PEMFC system of claim 1, wherein the electrolyte membrane comprises about 1% to about 50% of the carbon-containing semiconductor by volume of the membrane.

9. The PEMFC system of claim 1, wherein the electrolyte membrane comprises about 0% to about 2%, about 1% to about 5%, about 5% to about 10%, about 10% to about 20%, about 20% to about 30%, about 30% to about 40%, about 40% to about 50%, about 1% to about 20%, about 5% to about 30%, about 10% to about 40%, about 20% to about 50%, about 30% to about 50%, about 1% to about 25%, or about 25% to about 50% of the carbon-containing semiconductor by volume of the membrane.

10. The PEMFC system of claim 1, wherein the electrolyte membrane comprises about 5% to about 20% of the carbon-containing semiconductor by volume of the membrane.

11. The PEMFC system of claim 1, wherein the electrolyte membrane comprises a poly(perfluorosulfonic) acid membrane or a sulfonated polybenzimidazole membrane.

12. The PEMFC system of claim 1, wherein the electrolyte membrane comprises a sulfonated tetrafluoroethylene copolymer membrane.

13. The PEMFC system of claim 1, wherein the carbon-containing semiconductor becomes electronically conductive at a potential below the PEMFC's open circuit potential.

14. The PEMFC system of claim 1, wherein the carbon-containing semiconductor becomes reversibly oxidized in the range of −0.01 to about 1.4 V vs. a standard hydrogen electrode (SHE).

15. The PEMFC system of claim 1, wherein the shunting onset potential comprises a voltage of about 0.8 to about 2.0 vs. a standard hydrogen electrode (SHE).

16. The PEMFC system of claim 1, wherein the shunting onset potential comprises a voltage of greater than about 0.90 V vs. a standard hydrogen electrode (SHE).

17. The PEMFC system of claim 1, wherein the carbon-containing semiconductor has a conductivity of at least about $1\times10^{-3}$ S/cm at a potential above the shunting onset potential.

18. The PEMFC system of claim 1, wherein the carbon-containing semiconductor limits a potential of the positive electrode to a voltage lower than 1.5 vs. a standard hydrogen electrode (SHE).

19. The PEMFC system of claim 1, wherein the electrolyte membrane comprises a bilayer comprising a first carbon-containing semiconductor in a first layer and a second carbon-containing semiconductor in a second layer.

20. The PEMFC system of claim 19, wherein the first and second carbon-containing semiconductors have different or overlapping shunting onset potentials.

21. The PEMFC system of claim 1, wherein the electrolyte membrane comprises a plurality of layers, each layer comprising one or more carbon-containing semiconductors having different or overlapping shunting onset potentials.

22. The PEMFC system of claim 21, wherein each layer comprises the same, different, or combinations thereof of volume percentages of one or more carbon-containing semiconductors.

23. A method for preventing current reversal or electrode overpotential in the polymer-electrolyte-membrane fuel cell (PEMFC) system of claim 1, the method comprising incorporating into one or more electrolyte membranes one or more carbon-containing semiconductors that become electronically conductive at specific shunting potential conditions.

24. The method of claim 23, wherein the shunting onset potential comprises about 0.9 V vs. a standard hydrogen electrode (SHE).

25. A polymer-electrolyte-membrane fuel cell (PEMFC) system comprising:
a $H_2$ (g) fuel source;
an $O_2$ (g) source;
a positive electrode exposed to an electrolyte;
a negative electrode exposed to an electrolyte; and
one or more electrolyte membranes comprising sulfonated tetrafluoroethylene copolymer being positioned between the positive electrode and the negative electrode; wherein the electrolyte membrane further comprises a specific volume percentage of one or more carbon-containing semiconductors that become electronically conductive at a shunting onset potential of greater than about 0.9 V vs. a standard hydrogen electrode (SHE).

* * * * *